(12) United States Patent
Asakura et al.

(10) Patent No.: US 8,972,625 B2
(45) Date of Patent: Mar. 3, 2015

(54) ELECTRONIC APPARATUS AND HOST DETERMINATION METHOD

(71) Applicant: Sony Corporation, Tokyo (JP)

(72) Inventors: Yasuo Asakura, Tokyo (JP); Keitarou Kondou, Tokyo (JP); Makoto Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 79 days.

(21) Appl. No.: 13/827,836

(22) Filed: Mar. 14, 2013

(65) Prior Publication Data

US 2013/0262715 A1  Oct. 3, 2013

(30) Foreign Application Priority Data

Mar. 28, 2012 (JP) ................ 2012-075157

(51) Int. Cl.
*G06F 3/00* (2006.01)
*G06F 13/00* (2006.01)
*G06F 13/12* (2006.01)

(52) U.S. Cl.
CPC .................. *G06F 13/122* (2013.01)
USPC .................. 710/32; 710/16; 710/19

(58) Field of Classification Search
None
See application file for complete search history.

(56) References Cited

U.S. PATENT DOCUMENTS

2011/0225329 A1* 9/2011 Charna et al. ............ 710/62

FOREIGN PATENT DOCUMENTS

| JP | 3109346 U | 3/2005 |
|---|---|---|
| JP | 2008-097308 A | 4/2008 |
| JP | 2010-033519 A | 2/2010 |
| JP | 4438846 B2 | 3/2010 |

\* cited by examiner

*Primary Examiner* — Zachary K Huson
(74) *Attorney, Agent, or Firm* — Rader, Fishman & Grauer PLLC

(57) ABSTRACT

An electronic apparatus includes a plurality of interfaces and a host determination controller. To the plurality of interfaces, a plurality of host candidate devices are individually connected. The plurality of host candidate devices are each capable of serving as a host device that performs control. The host determination controller is configured to determine, based on a reception signal received from one of the plurality of host candidate devices, a predetermined host candidate device serving as a transmission source of the reception signal to be a host device, and to control a disconnection and a connection of at least one of the plurality of interfaces, the at least one of the plurality of interfaces corresponding to at least one of the other host candidate devices.

18 Claims, 10 Drawing Sheets a: Recording/ reproduction data via IF_A
b: Recording/ reproduction data via IF_B
c: Switching control data
d: Switching signal

FIG.6

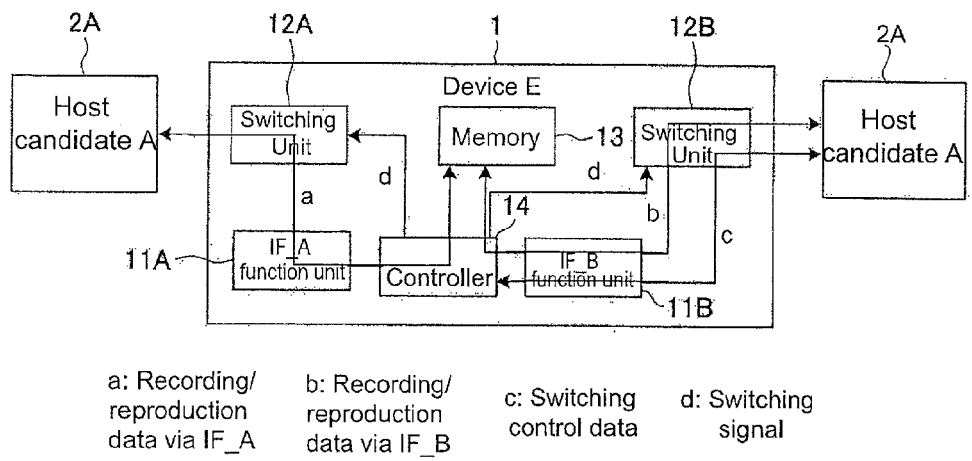

- a: Recording/reproduction data via IF_A
- b: Recording/reproduction data via IF_B
- c: Switching control data
- d: Switching signal

FIG.7

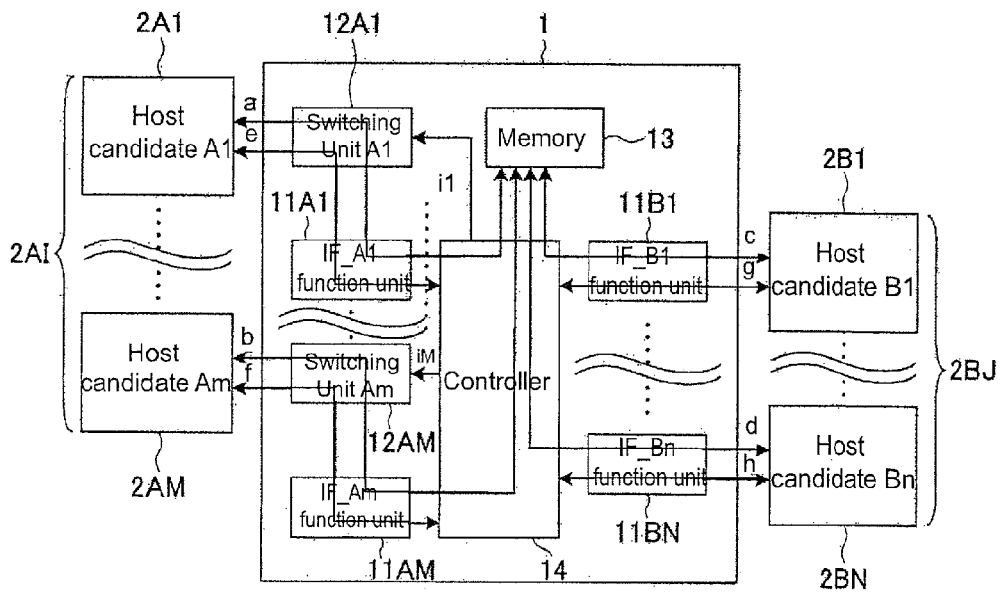

- a: Recording/reproduction data via IF_A1
- b: Recording/reproduction data via IF_Am
- c: Recording/reproduction data via IF_B1
- d: Recording/reproduction data via IF_Bn
- e: Switching control data A1
- f: Switching control data Am
- g: Switching control data B1
- h: Switching control data Bn
- i1: Switching signal A1 — iM: Switching signal Am

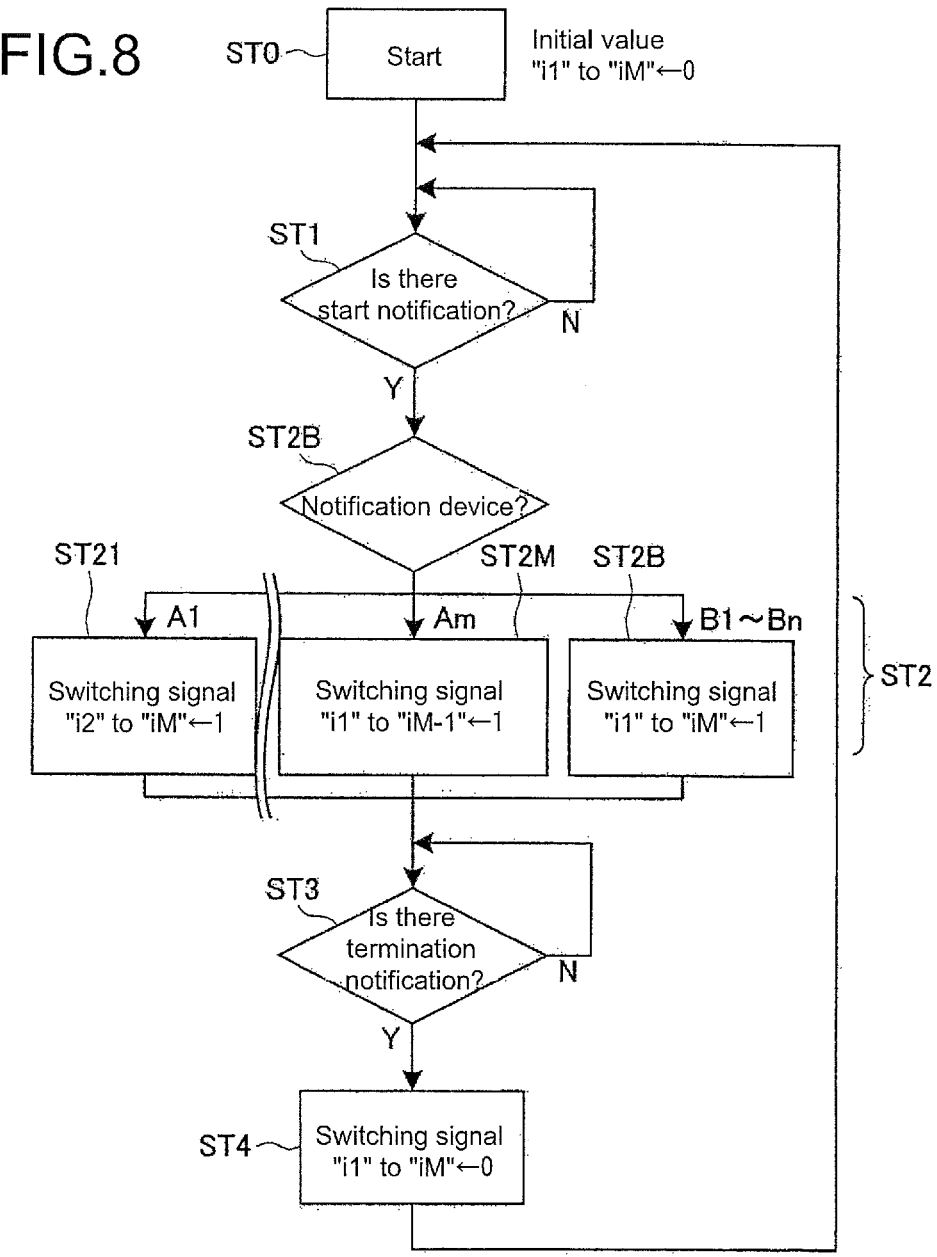

Host candidate A     IF1     Device A

Host candidate A     IF1     Device B

Host candidate B     IF2     Device B a: Recording/reproduction data via IF_A    b: Recording/reproduction data via IF_B a: Recording/reproduction data via IF_A    b: Recording/reproduction data via IF_B    c: Switching signal a: Recording/reproduction data via IF_A    b: Recording/reproduction data via IF_B    c: Switching signal a: Recording/reproduction data    b: Switching signal

ELECTRONIC APPARATUS AND HOST DETERMINATION METHOD

BACKGROUND

The present disclosure relates to an electronic apparatus that performs a host determination in which a device that performs control is determined from a plurality of connected devices, and to a host determination method.

Hereinafter, a host (or a host device) means a device that has a control function of issuing a command to an electronic apparatus (hereinafter, referred to as "device"). Further, the electronic apparatus (device) means a device or an electronic component that has functions of receiving a command from a host and performing some processing. Additionally, a host candidate (or a host candidate device) means a device that has a function to be a host.

FIG. 9 is a diagram showing a connection example of devices in the case where a device A is connected to a host candidate A and has one interface (also referred to as IF1).

As shown in FIG. 9, in the case where the device A has one interface (IF1), it is advantageous that a connection control system of the device A is made simple. However, on the contrary, it is difficult to connect the device A to a host candidate (not shown) having an interface other than the interface (IF1).

To eliminate such a disadvantage and improve the usability, it may be better to provide the device with a plurality of interfaces.

FIG. 10A is a diagram showing that a device B has a plurality of interfaces and connected to a host candidate A. FIG. 10B is a diagram showing that the device B having a plurality of interfaces is connected to a host candidate B.

Although the surface of the device B on which connectors are provided is not seen in FIGS. 10A and 10B, most commonly, at least two connectors that correspond to the respective host candidates A and B are provided side by side on the surface. Thus, more variety of devices are connectable compared to the case of FIG. 9, and more usable devices can be provided.

However, in the case where the device has a plurality of interfaces (IF1, IF2) as shown in FIGS. 10A and 10B, a new disadvantage that is not caused in the configuration of FIG. 9 is caused.

Specifically, when a plurality of host candidates connected to the interfaces (IF1, IF2) are simultaneously set as hosts and are going to control the device, data competition occurs and the device may malfunction. To prevent the data competition the malfunction of the device, it is necessary to use a host determination method, by which one host candidate is determined to be a host from host candidates connected to the plurality of interfaces (IF1, IF2).

In the case of a storage device, at least one interface thereof often conforms to the specifications of a USB (Universal Serial Bus) Mass Storage Class, in terms of compatibility with existing hosts.

A host candidate that is connected to a device conforming to the USB Mass Storage Class through a USB cable will be hereinafter described as a "USB connectable host candidate". When an interface is connected to the USB connectable host candidate, for example, when the USB connectable host candidate is connected to a device through a USB cable, the USB connectable host candidate starts the control from the position of a host. In the control from the position of a host in which data in the device is reads or written, the USB connectable host candidate first acquires a list of information in the device and then reads or writes the information in the device based on the acquired list of information in the device. Further, in response to disconnection of the interface, for example, removal of the USB cable from the device, the USB connectable host candidate terminates the control of the device from the position of a host.

In such a specific host candidate, for example, the interface of which conforms to the USB Mass Storage Class, when a cable is inserted into a connector of the device, the specific host candidate is going to act as a host, irrespective of the existence of other host candidates. Examples of the specific host candidate that behaves in such a way include a so-called Wi-Fi (registered trademark) memory card, in addition to the USB connectable host candidate. The Wi-Fi memory card is inserted into or removed from a slot of a device and a control function of a wireless LAN terminal is implemented on the Wi-Fi memory card, for example. The Wi-Fi memory card is different from a normal memory card in a host function specialized for wireless transmission and reception.

It should be noted that the device is not limited to the storage device. The USB connectable host candidate may be a small wireless transceiver that is directly provided to a USB connector of a device.

Many of the specific host candidates having various forms as described above are each set as a host by insertion or removal of a cable or a connector. In such a case, a host determination method in which insertion or removal of a cable, a connector, or the like is taken into consideration and an electrical connection or disconnection of an interface is included is necessary.

It should be noted that the phrase "connection or disconnection of an interface" is used as a broad concept meaning an electrical connection or disconnection of an interface, regardless of the presence or absence of a mechanical operation such as insertion or removal of a cable or a connector.

Japanese Patent Application Laid-open No. 2008-97308 (hereinafter, referred to as Patent Document 1), Japanese Utility Model Registration No. 3109346 (hereinafter, Patent Document 2), Japanese Patent Application Laid-open No. 2010-33519 (hereinafter, Patent Document 3), and Japanese Patent No. 4438846 (hereinafter, Patent Document 4) are known for disclosure of the system for achieving the host determination as described above.

Patent Document 1 discloses an electronic apparatus (device) that includes one common connector having a structure for exclusively connecting interfaces on two sides. Patent Document 1 adopts a determination method of limiting the number of host candidates simultaneously connected to a device to one by the provision of the common connector and determining the host candidate connected to the device to be a host.

FIG. 11 is a block diagram of a device B, showing the configuration disclosed in Patent Document 1 by restructuring the configuration for each function.

A host candidate A shown in FIG. 11 is a host candidate (USB connectable host candidate) having a USB interface. A host candidate B is a host candidate having a memory card interface.

The device B shown in FIG. 11 includes an IF_A function unit, an IF_B function unit, a controller, and a data processing unit.

The IF_A function unit and the IF_B function unit are processing parts of the interfaces to which the host candidate A and the host candidate B individually correspond, respectively.

In this configuration, only one of the host candidate A and the host candidate B is connectable to a common connector.

The connected host candidate can access the data processing unit via the IF_A function unit or IF_B function unit and the controller.

Patent Document 2 discloses an electronic apparatus equipped with a connector of a USB interface and a connector of a memory card interface.

In Patent Document 2, the following determination method is adopted. In the case where one host candidate is connected to the connector of the device B, the host candidate is set as a host, and in the case where two host candidates are connected to the connectors of the device B, a host candidate having a memory card interface is inevitably set as a host.

FIG. 12 is a diagram obtained by changing FIGS. 10A and 10B so as to show a connection relationship equivalent to that of a device C disclosed in Patent Document 2 (the device B is changed to the device C). It should be noted that Patent Document 2 discloses a configuration in which the device C is a strobe control apparatus having a duplex interface, and two host candidates as a memory card control chip and a USB control chip are connected to the strobe control apparatus.

FIG. 13 is a block diagram of the device C, showing the configuration disclosed in Patent Document 2 by restructuring the configuration so as to correspond to FIG. 12.

A host candidate A shown in FIG. 13 is a host candidate (USB connectable host candidate) having a USB interface (corresponding to IF1). In Patent Document 2, a USB control chip corresponds to the host candidate A.

A host candidate B is a host candidate having a memory card interface (corresponding to IF2). In Patent Document 2, a memory card control chip corresponds to the host candidate B.

A device C having the configuration shown in FIG. 13 includes an IF_A function unit, an IF_B function unit, a memory, a connection detection unit, and a switching unit.

The IF_A function unit and the IF_B function unit are processing parts of the interfaces (IF1 and IF2) of the host candidate A and the host candidate B, respectively.

The connection detection unit refers to a specific signal in a signal group that is input to the memory card interface (for example, IF2). When the potential of the signal referred to is equal to a ground potential, the connection detection unit determines that the host candidate B is connected to a connector of the memory card interface of the device C. On the other hand, when the difference between the potential of the signal referred to and a ground potential is large and an open state is determined, the connection detection unit determines that the host candidate B is not connected to the connector of the memory card interface of the device C.

In the case where the connection detection unit detects that the host candidate B is connected, the switching unit disconnects the USB interface (for example, IF1) on the host candidate A side. In the case where the connection detection unit detects that the host candidate B is not connected, the switching unit connects the USB interface on the host candidate A side.

In the case where the host candidate B is connected, the memory is accessed by the host candidate B via the IF_B function unit in a disconnected state of the USB interface of the host candidate A. On the other hand, in the case where the host candidate B is not connected, the USB interface of the host candidate A is connected, and therefore the memory is accessed by the host candidate A via the IF_A function unit.

Patent Document 3 discloses an electronic apparatus equipped with a connector of a USB interface (IF1) and a connector of any second interface (IF2).

In Patent Document 3, the following determination method is adopted. In the case where one host candidate is connected to a connector of a device C, the host candidate is set as a host, and in the case where two host candidates are connected to the connector of the device C, a host candidate having a USB interface (IF1) is set as a host on the condition that the host candidate is continuously connected to the connector for a predetermined period of time or more.

FIG. 14 is a block diagram of the device C, showing the configuration disclosed in Patent Document 3 by restructuring the configuration so as to correspond to the block diagrams of the other Patent Documents.

A host candidate A shown in FIG. 14 is a host candidate (USB connectable host candidate) having a USB interface (IF1). A host candidate B is a host candidate having a second interface (IF2).

The device C shown in FIG. 14 includes an IF_B function unit, a data selection unit, a connection detection unit, and a data processing unit.

The IF_B function unit is a processing part of the interface (IF2) of the host candidate B.

The data selection unit is a conversion part of a signal of the interface (IF2) of the host candidate B and a signal of an interface (IF1) of the host candidate A. The data selection unit also has a function of the IF_A function unit shown in FIG. 13, for example.

The connection detection unit refers to a specific signal in a signal group that is input to the USB interface (IF1). When the potential of the signal referred to is equal to 5V, the connection detection unit determines that the host candidate A is connected to a connector of the USB interface (IF1) of the device. In the case where the potential of the signal referred to is largely different from 5V and an open state is determined, the connection detection unit determines that the host candidate A is not connected.

The connection detection unit transmits a detection result as to whether the host candidate A is connected or not to the data selection unit. In the case where the connection detection unit detects that the host candidate A is connected, the data selection unit prohibits access from the host candidate B through the second interface (IF2) and permits access from the host candidate A. Thus, the data processing unit is accessed from the host candidate A.

On the other hand, in the case where the connection detection unit detects that the host candidate A is not connected, access permission is given to the second interface (IF2) side. Thus, the data processing unit is accessed from the host candidate B through the IF_B function unit.

By the connection processing described above, in the case where the host candidate A is continuously connected for a predetermined period of time or more, the data processing unit is accessed from the host candidate A, regardless of whether the host candidate B is connected or not. On the other hand, in the case where the host candidate A is not continuously connected for a predetermined period of time or more, the interface of the host candidate B is connected. Thus, the data processing unit is accessed from the host candidate B via the IF_B function unit.

Patent Document 4 discloses a device equipped with a connector of a USB interface and a connector of a PCI_EXPRESS interface.

Patent Document 4 adopts the following method. In a storage device capable of simultaneously connecting connectors of interfaces on two sides to a host, a host is determined by the logic of a switching signal (applied signal of an IFSEL (interface selection) terminal) from the outside.

FIG. 15 is a diagram obtained by changing FIG. 12 so as to show a connection relationship equivalent to that of a device disclosed in Patent Document 4.

FIG. 16 is a block diagram of the device D, showing the configuration disclosed in Patent Document 4 by restructuring the configuration so as to correspond to FIG. 15.

A host A shown in FIG. 16 is a host having a USB interface (for example, IF1) and a PCI_EXPRESS interface (for example, IF2). A device D is a device conforming to both the interfaces. Patent Document 4 discloses, as a configuration corresponding to the device D, an Express Card serving as a removable memory card having a PCI_Express and a USB as external interfaces.

The device D having the configuration shown in FIG. 16 includes an IF_A function unit, an IF_B function unit, a controller, and a memory.

The IF_A function unit is a processing part of the USB interface. When a switching signal is 1 (power potential), the signal is valid, and when the switching signal is 0 (ground potential), the signal is invalid. The IF_B function unit is a processing part of the PCI_EXPRESS interface. When a switching signal is 0 (ground potential), the signal is valid, and when the switching signal is 1 (power potential), the signal is invalid. Further, the device D includes an input terminal (IFSEL terminal) exclusively for a switching signal, which is provided separate from the above-mentioned interfaces.

Therefore, one of the interfaces is selected according to the logic of the switching signal, and access to the memory is permitted via the selected interface and the controller.

SUMMARY

In the case where the host determination methods disclosed in Patent Documents 1 to 3 are used, it is necessary to inevitably insert or remove a connector in switching for selecting a host from host candidates.

In the case of Patent Document 1, the insertion or removal of a connector is necessary in a host connected to the device B and a host candidate device to be set as a new host.

In the case of Patent Document 2, the insertion or removal of a connector of a memory card interface, to which the host candidate B is connected, is necessary.

In the case of Patent Document 3, the insertion or removal of a connector of a USB interface, to which the host candidate A is connected, is necessary.

The insertion or removal of a connector generally involves manual operations and a lot of time is spent therefor, which hinders high-speed switching of hosts. In the techniques disclosed in Patent Documents 1 to 3 in which the host determination method involving the insertion or removal of a connector is adopted, it is necessary to perform switching of hosts frequently. Therefore, it is difficult to apply each of the techniques disclosed in Patent Documents 1 to 3 to a device in which high-speed performance is expected in total processing including a switching time.

On the other hand, in Patent Document 4, an input terminal exclusively used for the switching signal (IFSEL terminal) is provided, and therefore the switching without involving the insertion or removal of a connector is enabled.

However, in an embodiment of Patent Document 4, the disclosed method of generating a switching signal is handled manually using a mechanical switch, and other methods are unclear. For that reason, the method of Patent Document 4 involves the detriment of time and effort due to manual operations and the inhibition of high-speed performance resulting from the manual operations, as in the devices disclosed in Patent Documents 1 to 3 described above.

It is desirable to propose a system of a host determination capable of eliminating time and effort due to manual operations and a time loss, operating at high-speed and reliably, and avoiding malfunctions, and to provide an electronic apparatus and a host determination method to which the above system is applied.

According to an embodiment of the present disclosure, there is provided an electronic apparatus including: a plurality of interfaces to which a plurality of host candidate devices are individually connected, the plurality of host candidate devices each being capable of serving as a host device that performs control; and a host determination controller configured to determine, based on a reception signal received from one of the plurality of host candidate devices, a predetermined host candidate device serving as a transmission source of the reception signal to be a host device, and to control a disconnection and a connection of at least one of the plurality of interfaces, the at least one of the plurality of interfaces corresponding to at least one of the other host candidate devices.

According to another embodiment of the present disclosure, there is provided an electronic apparatus including: a plurality of interfaces to which a plurality of host candidate devices are individually connected, the plurality of host candidate devices each being capable of serving as a host device that performs control; and a host determination controller configured to determine, based on a reception signal received from one of the plurality of host candidate devices, a predetermined host candidate device serving as a transmission source of the reception signal to be a host device, and to control a disconnection and a connection of at least one of the plurality of interfaces, the at least one of the plurality of interfaces corresponding to at least one of the other host candidate devices, the at least one of the other host candidate devices being configured to certainly operate as a host device when connected to an interface.

According to another embodiment of the present disclosure, there is provided a host determination method including: determining, based on a reception signal received from one of a plurality of host candidate devices, a predetermined host candidate device serving as a transmission source of the reception signal to be a host device, the plurality of host candidate devices being connected to an electronic apparatus via a plurality of interfaces individually corresponding to the plurality of host candidate devices and each being capable of serving as a host device that performs control; and controlling a disconnection and a connection of at least one of the plurality of interfaces, the at least one of the plurality of interfaces corresponding to at least one of the other host candidate devices.

According to another embodiment of the present disclosure, there is provided a host determination method including: determining, based on a reception signal received from one of a plurality of host candidate devices, a predetermined host candidate device serving as a transmission source of the reception signal to be a host device, the plurality of host candidate devices being connected to an electronic apparatus via a plurality of interfaces individually corresponding to the plurality of host candidate devices and each being capable of serving as a host device that controls the electronic apparatus; and controlling a disconnection and a connection of at least one of the plurality of interfaces, the at least one of the plurality of interfaces corresponding to at least one of the other host candidate devices, the at least one of the other host candidate devices being configured to certainly operate as a host device when connected to an interface.

According to the above configurations, based on the reception signal received via the interface, a host candidate device serving as a transmission source of the reception signal is determined to be a host device. Therefore, when a host device is authenticated, it is unnecessary to disconnect or connect the interface. Further, based on the reception signal, the disconnection and the connection of at least one of the plurality of interfaces corresponding to at least one of the other host candidate devices is controlled. This control is based on the reception signal, not based on a manual operation. In addition, in the case of using a switch, the control is enabled by an electrical switch, not by a mechanical switch manually operated. In other words, an electrical disconnection or connection of the interface is controlled based on the reception signal.

All the host candidate devices, each of which is connected to an interface as a control target, may be set to be a host device when the electronic apparatus receives a reception signal. Alternatively, all or some of the host candidate devices may be host candidate devices each configured to certainly operate as a host device when connected to an interface, such as USB connectable host candidate devices.

By the control of a disconnection and a connection of the interface based on the reception signal, data collision and malfunctions resulting from the data collision are not caused.

According to the present disclosure, it is possible to provide an electronic apparatus that can perform a host determination capable of eliminating time and effort due to manual operations and a time loss, operating at high-speed and reliably, and avoiding malfunctions, and to provide a host determination method for the electronic apparatus.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 6 is a block diagram of an electronic apparatus according to a fifth embodiment;

FIG. 7 is a block diagram of an electronic apparatus according to a sixth embodiment;

FIG. 8 is a flowchart showing a procedure of a host determination method (fourth method example) according to a sixth embodiment;

DETAILED DESCRIPTION OF EMBODIMENTS

Embodiments of the present disclosure will be described with reference to the drawings in the following order.

1. First Embodiment: High Embodiment of Second to Sixth Embodiments
2. Second Embodiment: Embodiment Showing First Method Example of One Host Candidate A and One Host Candidate B
3. Third Embodiment: Embodiment Showing Second Method Example of One Host Candidate A and One Host Candidate B
4. Fourth Embodiment: Embodiment Showing Third Method Example of One Host Candidate A and One Host Candidate B
5. Fifth Embodiment: Embodiment Showing Case of Two Host Candidates A
6. Sixth Embodiment: Embodiment Showing Case of Plurality of Host Candidates A and Plurality of Host Candidates B 1. First Embodiment This embodiment is an embodiment that summarizes other more specific embodiments and discloses features of the present disclosure.

(Connection Between Electronic Apparatus and Host Candidate Device)

Figure 1:
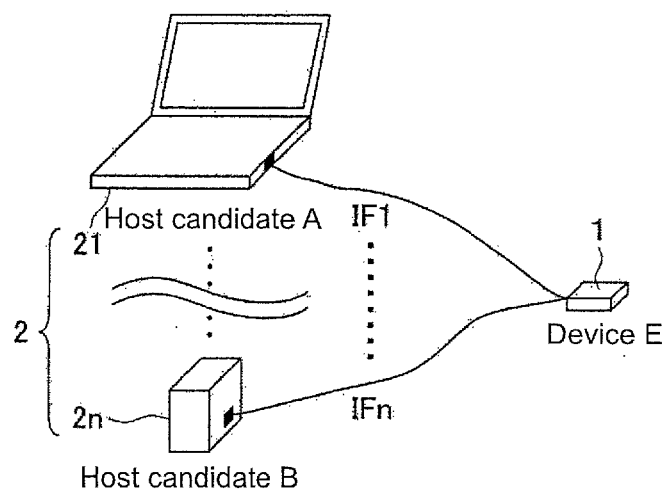
FIG. 1 is a diagram showing an example of a connection between an electronic apparatus and a plurality of host candidate devices.

FIG. 1 is a diagram showing an example of a connection between an electronic apparatus to which an embodiment of the present disclosure is applied and a plurality of host candidate devices.

In FIG. 1, an apparatus 1 referred to as a "device E" corresponds to an "electronic apparatus". In the following description, the apparatus 1 and the "device E" will be uniformly described as an "electronic apparatus 1".

In FIG. 1, devices from a device 21 that has the shape of a personal computer (PC) and is referred to as a "host candidate A" to a device 2n that has the shape of a box and is referred to as a "host candidate B" correspond to "a plurality of host candidate devices 2". Further, configurations IF1 to IFn are interfaces that correspond to the respective host candidate devices 2.

It should be noted that the number n of host candidate devices 2 is any integer if the number is two or more.

(Interface)

In this embodiment, n host candidates at the maximum may be connected to one electronic apparatus 1 via n interfaces (IF1 to IFn) that correspond to the respective host candidates.

Therefore, the electronic apparatus 1 does not include a common connector but includes n individual connectors.

Here, in the case of a cable connection as in the example of FIG. 1, the term "interfaces (IF1 to IFn)" is used to mean the configuration including cables, connectors at both ends of each cable, connectors (not shown) provided to both the electronic apparatus 1 and the host candidate devices 2 (21 to 2n), and an IF_function unit. It should be noted that the IF_function unit is a functional circuit part that may perform processing of electrically controlling a connection and a disconnection of a signal path and other processing associated with the interfaces (for example, amplification of signals, waveform shaping, and the like), and that is built in a device or an apparatus.

FIG. 1 exemplifies interfaces including cables, but the interfaces may have a form in which no cables are used and connectors are connected to each other.

(Host Candidate and Definition Thereof)

In FIG. 1, the "host candidate A" and the "host candidate B" indicate types of host candidates used in the other embodiments to be described later. FIG. 1 is also used as a connection diagram of the other embodiments, and therefore the "host candidate A" and the "host candidate B" merely indicate the types of host candidates.

Therefore, only in the case of the first embodiment, there is no fundamental meanings in distinguishing the "host candidate A" from the "host candidate B" in description. In the embodiments of the present disclosure, a necessary condition for the electronic apparatus 1 is that in order to control disconnection and connection of interfaces corresponding host candidate devices other than a predetermined host candidate device to be set as a "host", a signal (reception signal) that may be a trigger of the control of the disconnection and connection is transmitted from the predetermined host candidate device.

Specifically, one of the most fundamental necessary conditions in the present disclosure is "to set, based on a reception signal received from one of a plurality of host candidate devices, the predetermined host candidate device serving as a transmission source as a host device". In addition thereto, another necessary condition is "to control a disconnection and a connection of at least one interface corresponding to at least one of the other host candidate devices based on the reception signal".

In the second to fourth embodiments to be described later, a host candidate device that may be the predetermined host candidate device as described above is described as a "host candidate B" and distinguished from the other "host candidates A". In the sixth embodiment, other than the "host candidate B", the "host candidate A" may also be a predetermined host candidate device. In those embodiments, n host candidate devices may include at least one "host candidate A" and at least one "host candidate B".

On the other hand, in the fifth embodiment to be described later, it is assumed that there are a plurality of "host candidates A". In this case, a case where the electronic apparatus 1 sets a certain "host candidate A" as a "host" based on a reception signal from the "host candidate A" and controls the disconnection and connection of an interface of another "host candidate A" is also assumed. In this case, the "host candidate A" is a "device that may be set as a host when connected to a connector" (first definition).

It should be noted that the "host candidate A" may be defined as a "device configured to operate as a host device when connected to an electronic apparatus", and the "host candidate B" may be defined as a "device configured not to perform such an operation (second definition).

The second definition is similar to the first definition, but it is not the same exactly. In this case, the "host candidate B" may be defined as a "host candidate that may be a host by a trigger other than a connection of an interface, for example, transmission and reception of a signal.

The "host candidate A" may be defined as a "device that can acquire or recognize, when connected to a connector of an electronic apparatus, a list of inside information of the electronic apparatus to perform operations, but does not acquire or recognize the list again until the connector is removed and then connected again" (third definition). In such a case, the "host candidate B" is a "device capable of acquiring or recognizing again the list of inside information of the electronic apparatus while the interface thereof is being connected".

The "host candidate A" may be defined as a "device including an IF_function unit having a function of processing of electrically controlling the disconnection and connection of an interface by the control from the interior of an electronic apparatus serving as a connection destination" (fourth definition). In such a case, the "host candidate B" is a "device having an interface that does not have a function of such processing".

In any case, when the disconnection and connection of an interface corresponding to at least one of the plurality of host candidate devices is controlled, it is necessary for a predetermined host candidate device serving as a "host candidate A" or a "host candidate B" to transmit a signal to be a trigger of the control. In other words, as described above, the fundamental necessary condition in the present disclosure is "to control, based on a reception signal from the predetermined host candidate device, the disconnection and connection of at least one interface corresponding to at least one of the other host candidate devices". For that reason, the plurality of host candidate devices may not be limited to FIG. 1 and all of the plurality of host candidate devices may be the "host candidates A" (fifth embodiment). Alternatively, there may be a plurality of "host candidates A" and a plurality of "host candidates B" (sixth embodiment).

Accordingly, it is necessary for at least one of the n host candidate devices to be a "host candidate A".

Second Embodiment

A second embodiment and the following embodiments according to the present disclosure each show a specific configuration of a device (electronic apparatus 1) among the configurations shown in the first embodiment. In the following embodiments, a case where the electronic apparatus 1 is a mass storage device will be described as an example, but the electronic apparatus 1 is not limited thereto.

(Block Configuration of Electronic Apparatus)

Figure 2:
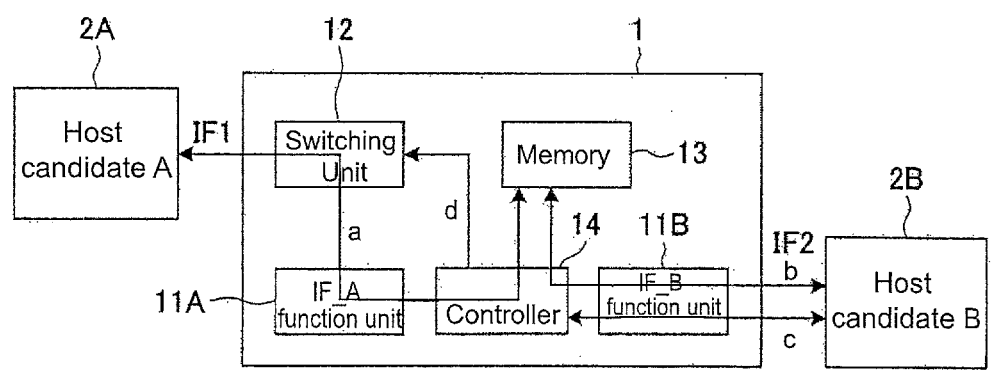
FIG. 2 is a block diagram of an electronic apparatus, showing a first configuration example of the electronic apparatus according to a second embodiment.

FIG. 2 is a block diagram of the electronic apparatus 1, showing a first configuration example of the electronic apparatus 1 according to the second embodiment. In FIG. 2, a "host candidate A" 2A and a "host candidate B" 2B are host candidates included in the host candidate devices 2 (21 to 2n) shown in FIG. 1.

In FIG. 2, the host candidate A (2A) meets any one of the definitions described above. Here, for example, it is assumed that the host candidate A (2A) is a host candidate device to be set as a host based on only a connection operation of an interface from a disconnected state. The operation of a disconnection/connection of the interface is any of an insertion/removal of a connector of the interface and an electrical disconnection/connection of an IF_function unit to be described later.

Examples of the interface of the host candidate A (2A) include a USB (Universal Serial Bus) interface conforming to a USB Mass Storage Class.

Examples of a USB connectable host candidate A (2A) include a personal computer (PC) and other computer-based devices (whatever types including portable type and stationary type). Further, the host candidate A (2A) may be an electronic component, for example, a card memory including a memory controller. Such a memory card has a host function of outputting a command from the memory controller to the electronic apparatus 1. The memory card can be provided with another function such as a Wi-Fi transceiver. The card-type electronic component is not limited to the memory card and may be an authentication card including a controller, and the like. In the case where the host candidate A (2A) is the electronic component, the host candidate A (2A) is not limited to a card type electronic component and may be other portable electronic components.

The host candidate B (2B) is a host candidate device having an arbitrary interface. The host candidate B (2B) is a host candidate device that reads and writes inside information of the electronic apparatus 1 or changes the inside information. Specifically, the host candidate B (2B) in FIG. 2 is a predetermined host candidate device to function as a host.

Examples of the host candidate B (2B) include a PC and other computer-based devices (whatever types including portable type and stationary type). Further, the host candidate B (2B) may be a terminal adapter (TA), a router, or the like to be connected to a network such as Ethernet (registered trademark). Those network-connected devices may be devices including a finished product having a casing and a substrate-type mounted component (intermediate product) to be mounted in another device.

The electronic apparatus 1 shown in FIG. 2 includes an IF_A function unit 11A, an IF_B function unit 11B, a switching unit 12, a memory 13, and a controller 14.

The IF_A function unit 11A and the IF_B function unit 11B are processing parts of interfaces of the host candidate A (2A) and the host candidate B (2B), respectively. The IF_A function unit 11A and the IF_B function unit 11B may perform processing associated with the interfaces (for example, amplification of signals, waveform shaping, and the like).

The switching unit 12 is a part to disconnect or connect an interface path between the IF_A function unit 11A and the host candidate A (2A). The switching unit 12 is controlled by a switching signal supplied from the controller 14 as described later. Thus, the switching unit 12 functions as a switch to electrically disconnect or connect the interface path without a manual operation.

In the case where the switching signal is 0, the interface of the host candidate A (2A) is connected, and in the case where the switching signal is 1, the interface of the host candidate A (2A) is disconnected. For example, in the case where the interface of the host candidate A (2A) conforms to the USB Mass Storage Class, a pull-up resistor of a D+ signal or a D− signal in the USB interface is connected/disconnected. In the connected state of the pull-up resistor, data can be input, and the interface enters a connected state. When the pull-up resistor is disconnected, data is not input, and the interface enters a disconnected state.

It should be noted that the electronic apparatus 1 may be configured such that the switching unit 12 shown in FIG. 2 is omitted and the IF_A function unit 11A has a function of the switching unit 12.

The memory 13 is a part to store and reproduce data (inside information). Examples of the memory 13 include a DRAM (Dynamic Random-Access Memory), a hard disk, and a flash memory.

The controller 14 is a part to control and manage the IF_A function unit 11A, the IF_B function unit 11B, the switching unit 12, and the memory 13. The controller 14 may be a CPU (Central Processing Unit) or the like that integrally manages and controls the whole of the electronic apparatus 1 or may have only a function of controlling the interface.

It should be noted that the controller 14 may have one or both of the functions of the IF_A function unit 11A and the IF_B function unit 11B.

In addition, FIG. 2 shows the case where the electronic apparatus 1 is a storage device, and therefore the memory 13 is certainly provided. However, in the case where the electronic apparatus 1 is another apparatus whose main function is not information storage, for example, the memory 13 can be omitted. In such a case, inside information to be read and written or changed by the host candidate B (2B) may be a program, various types of control data, and the like that are held in a built-in ROM (Read-Only Memory) unit, a built-in RAM (Random Access Memory) unit, or a resistor in the controller 14, for example.

In FIG. 2, small alphabets represent various signals and various pieces of data. When those pieces of data (information) and signals are described herein, "a", "b", "c", "d", and the like will be used.

Specifically, in FIG. 2, recording/reproduction data "a" via the IF_A flows between the host candidate A (2A) and the memory 13 via the IF_A function unit 11A and the controller 14. Recording/reproduction data "b" via the IF_B flows between the host candidate B (2B) and the memory 13 via the IF_B function unit 11B. Switching control data "c" flows between the host candidate B (2B) and the controller 14 via the IF_B function unit 11B. As the switching control data "c" that flows from the host candidate B (2B) to the controller 14, a signal transmitted from the host candidate B (2B) serving as a predetermined host candidate device (reception signal for the electronic apparatus 1) may be used.

In this operation of exchanging data and signals, the controller 14 has a function of transmitting and receiving recording/reproduction data among the IF_A function unit 11A, the IF_B function unit 11B, and the memory 13. Further, the controller 14 has functions of receiving the switching control data "c" from the IF_B function unit 11B, generating a switching signal based on the switching control data "c", and transmitting the generated switching signal to the switching unit 12. FIG. 2 shows that the switching signal "d" is output from the controller 14 to the switching unit 12.

(Host Determination Method (First Method Example))

Next, a description will be given on the generation of the switching signal "d" in the controller 14 and a host determination method (first method example) based on the switching signal "d".

Figure 3:
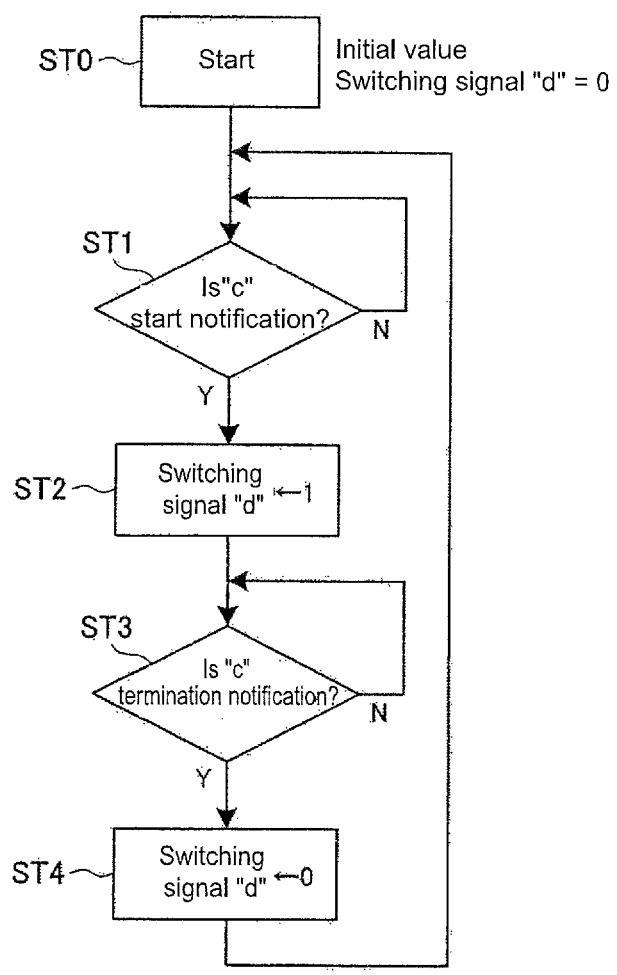
FIG. 3 is a flowchart showing a procedure of a host determination method (first method example) according to the second embodiment.

FIG. 3 is a flowchart showing the switching signal "d" in the controller 14 of the storage device to which the embodiment of the present disclosure is applied and showing a procedure of a host determination method (first method example) based on the switching signal "d".

Start (ST0) in the flowchart shows an initial state of the device (electronic apparatus 1). In the Start (ST0), after the initialization of the device, the controller 14 sets the switching signal "d" to 0 and waits until receiving a start notification. The controller 14 constantly or periodically monitors a reception of the start notification (Step ST1).

Here, the start notification is a notification with which the host candidate B (2B) starts recording/reproduction in and from the memory 13. The start notification is also one kind of the switching control data "c" (see FIG. 2) generated prior to the data transmission/reception, out of reception signals received by the electronic apparatus 1 from the host candidate B (2B). The switching control data "c" may be a start request instead of the start notification.

At the time when the controller 14 recognizes the start notification, the host candidate B (2B) serving as a transmission source of the start notification is determined to be a "host".

When detecting a reception of the start notification in Step ST1, the controller 14 sets the switching signal "d" to 1 in the next Step ST2 so that the interface of the host candidate A (2A) is disconnected. Specifically, the controller 14 generates the switching signal "d" and transmits the switching signal "d" to the switching unit 12, and the switching unit 12 disconnects the interface of the host candidate A (2A).

After that, the host and the electronic apparatus 1 exchange data through a necessary procedure for establishing communications. Specifically, the host candidate B (2B) serving as the "host" first acquires or recognizes a list of inside information in the memory 13 as appropriate. When it is determined that data has to be written, the controller 14 receives reception data as one kind of the recording/reproduction data "b" via IF_B shown in FIG. 2 from the host candidate B (2B) and writes the data in a predetermined address of the memory 13. Further, in the case of data read, the controller 14 reads inside information from the memory 13 and transmits the inside information to the host candidate B (2B) as transmission data. The transmission data serves as one kind of the recording/reproduction data "b" via IF_B shown in FIG. 2. In the case of rewrite of all data, the data read and write according to the above procedures may be executed by a necessary number of steps.

When the data transmission/reception is terminated, the controller 14 waits until receiving a termination notification. The controller 14 constantly or periodically monitors a reception of the termination notification (Step ST3).

Here, the termination notification is a notification with which the host candidate B (2B) terminates recording/reproduction in and from the memory 13. The termination notification is also one kind of the switching control data "c" (see FIG. 2) transmitted after the data transmission/reception, out of reception signals received by the electronic apparatus 1 from the host candidate B (2B). The switching control data "c" may be a termination request instead of the termination notification.

For example, at the time when the controller 14 recognizes the termination notification, the setting of "host" of the host candidate B (2B) serving as the transmission source of the termination notification is reset.

When detecting a reception of the termination notification in Step ST3, the controller 14 returns the switching signal "d" to be 0 in the next Step ST4 so that the interface of the host candidate A (2A) is reconnected. Specifically, the controller 14 changes the logic of the switching signal "d" into 0 and transmits the changed switching signal "d" to the switching unit 12, and the switching unit 12 connects the interface of the host candidate A (2A).

After that, the processing flow returns to the initial state after the start and enters again a standby state in which a reception of a start notification is monitored. When a start notification is received again, Steps ST1 to ST4 are executed again as described above. Then, a host candidate of a transmission source is set as a "host" and then data transmission/reception is performed. After that, the setting of "host" is reset.

In the host determination method shown in FIG. 3, in Step ST2, the switching signal "d" is set to 1 and the interface of the host candidate A (2A) is disconnected. Therefore, when the host candidate B (2B) is recording or reproducing data in and from the memory 13, the host candidate A (2A) does not perform recording/reproduction on the memory 13. For that reason, different pieces of data from different host candidates are not simultaneously written in the same address of the memory and data collision does not occur, with the result that the device can be prevented from malfunctioning.

Further, the host determination method shown in FIG. 3 is a determination method including the connection/disconnection of the interface of the host candidate A (2A). Therefore, except when the host candidate B (2B) is recording or reproducing data in and from the memory 13, the host candidate A (2A) can correctly perform recording/reproduction on the memory 13.

(Arbitration Between Host Candidates B)

It should be noted that when there are a plurality of host candidates B (2B), each of which may serve as a host, the determination of a host is desirably performed in the same manner as in a normal arbitration in communications. For example, when none of the host candidates including the host candidate A (2A) is set as a "host", a host candidate that first and foremost transmits a trigger signal for obtaining a function of a host, such as a start signal, is determined to be a "host". In the case where a certain host candidate is set as a "host" and another host candidate transmits a trigger signal, the other host candidate waits until the processing of the host candidate that is currently set as a "host" is terminated and then the setting of "host" is reset. Alternatively, the processing of the host candidate that transmits the trigger signal afterward may be performed during the processing of the host candidate serving as the current "host" by interruption. At that time, the processing occupancy of interruption may be set in advance to be as high as the processing occupancy of the host candidate that transmits the trigger signal first and foremost.

In any case, while one or more host candidates B (2B) are executing processing, the interface of the host candidate A (2A) is disconnected, and therefore the host candidate A (2A) does not perform processing.

3. Third Embodiment

In the second embodiment described above, the data recording/reproduction has been described, but the data recording and the data reproduction are not distinguished from each other. However, there is a high probability that data collision actually occurs when two host candidates simultaneously performs access and an operation (execution of processing) of at least one of the two host candidates is data recording (write). Therefore, if the access from the host candidate A (2A) is prevented by a disconnection of the interface thereof only at a time of write, the limit of access is not a waste, which is effective.

A third embodiment discloses a host determination method (second method example) in which a host candidate B (2B), configured to write data only when data write is detected, is set as a "host". The configuration of the electronic apparatus 1 is the same as that of FIG. 2, and therefore the description thereof will be omitted in this embodiment.

(Host Determination Method (Second Method Example))

Figure 4:
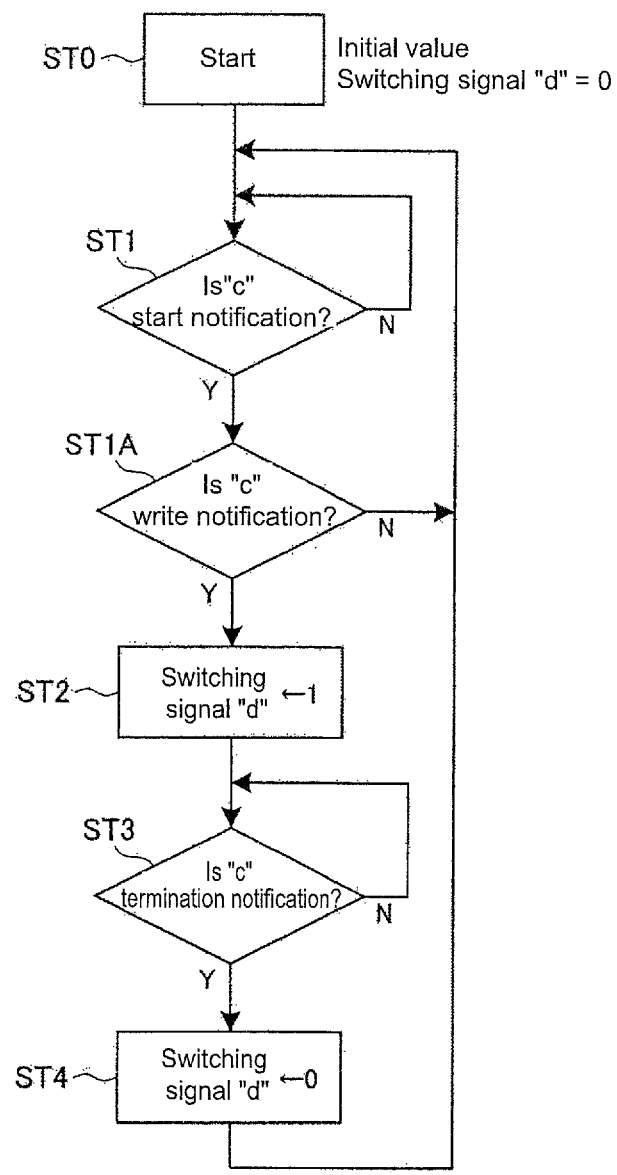
FIG. 4 is a flowchart showing a procedure of a host determination method (second method example) according to a third embodiment.

FIG. 4 is a flowchart showing a procedure of a host determination method (second method example) according to the third embodiment.

The second method example shown in FIG. 4 is different from the first method example shown in FIG. 3 in that Step ST1A for detecting whether the notification is a write notification or not is added between Steps ST1 and ST2 of FIG. 3. Other steps in the second method example are basically the same as those in the first method example.

Here, the write notification is a notification signal that is transmitted from the host candidate B (2B) only at a time of data write, after the host candidate B (2B) transmits the start notification for starting recording/reproduction in and from the memory 13. The write notification is the same as the start notification in that the write notification is one kind of the switching control data "c" (see FIG. 2) generated prior to the data transmission/reception, out of reception signals received by the electronic apparatus 1 from the host candidate B (2B). However, in the second method example, the start notification is not used as a trigger for the processing of disconnecting the interface of the host candidate A (2A). The write notification obtained thereafter is used as a trigger for the processing of disconnecting the interface of the host candidate A (2A). The switching control data "c" used as a trigger may be a write request instead of the write notification.

At the time when the controller 14 recognizes the write notification, the host candidate B (2B) serving as a transmission source of the write notification is determined to be a "host".

After that, the data reception (or data transmission) is performed as in the first method example. In the case of write, write data is received. In the case of write in combination with read, data transmission/reception may be performed. When the termination notification is detected in the next Step ST3, as in the first method example, the switching signal "d" is reset to 0 in Step ST4. Accordingly, the interface of the host candidate A (2A) is reconnected and the setting of "host" of the host candidate B (2B) is reset. Then, the processing flow is returned to a state after initialization.

In the host determination method of the second method example, in the case where an operation (execution of processing) of the host candidate B (2B) with respect to the memory 13 is data recording (rewrite of inside information), the interface of the host candidate A (2A) is disconnected and then reconnected after the operation, as in the first method example.

On the other hand, in the case where the operation is data reproduction (read of inside information), the interface of the host candidate A (2A) is not disconnected, unlike the first method example. Therefore, in the case where the operation is data reproduction, a time spent for the disconnection and connection of the interface can be omitted, and host switching can be performed more effectively.

(System for Preventing Write from Host Candidate A)

However, there may be a case where while the host candidate B (2B) is reproducing data from the memory 13, the host candidate A (2A) records data in the memory 13. When data reproduction and data recording are performed on the same address of the memory 13, data may not be correctly recorded/reproduced. In the worst case, there is a probability that data itself is corrupted. In this regard, it is necessary to provide a system in which in a period during which the host candidate B (2B) is set as a "host", data reproduction by the host candidate A (2A) is allowed but the data recording is not allowed.

In this system, for example, when the host candidate B (2B) is accessing the memory 13, the controller 14 may favorably transmit some signal notifying the host candidate A (2A) of "during use", for example, a busy signal. While a busy signal is being transmitted, it is possible to leave the interpretation of the busy signal to the host candidate A (2A) side. In this case, while recognizing the busy signal, the host candidate A (2A) does not write data in the memory 13.

However, the method of leaving the interpretation of the busy signal to the host candidate A (2A) is not inadvisable under the condition where a host candidate A (2A) to be connected is not known.

In a more desirable method, when the controller 14 is outputting the busy signal, write by host candidates other than the host candidate B (2B) serving as a "host" is considered to be invalid and not received. However, an operation of data read is received. Accordingly, it is unnecessary to establish a rule to "prohibit data write when a busy signal is being output" for the host candidate A (2A) side. As a result, an arbitration technique can be simplified.

In the third embodiment, the disconnection of the interface allows prohibition of access from the host candidate A (2A) only in a period during which data collision may occur. Thus, it is possible to provide a more efficient host determination method than that of the first method example.

4. Fourth Embodiment

The third embodiment described above relates to the efficiency from the viewpoint of data collision.

On the other hand, in the case where a connection control period during which only a disconnection and a reconnection of the interface are performed exists, this period is considered to be useless in terms of an effective processing time of data recording/reproduction. Therefore, it is desirable to shorten the connection control period for only the disconnection and the reconnection as much as possible.

The fourth embodiment discloses a host determination method (third method example), by which a connection control period considered to be useless in terms of an effective processing time can be shortened.

(Host Determination Method (Third Method Example))

Figure 5:
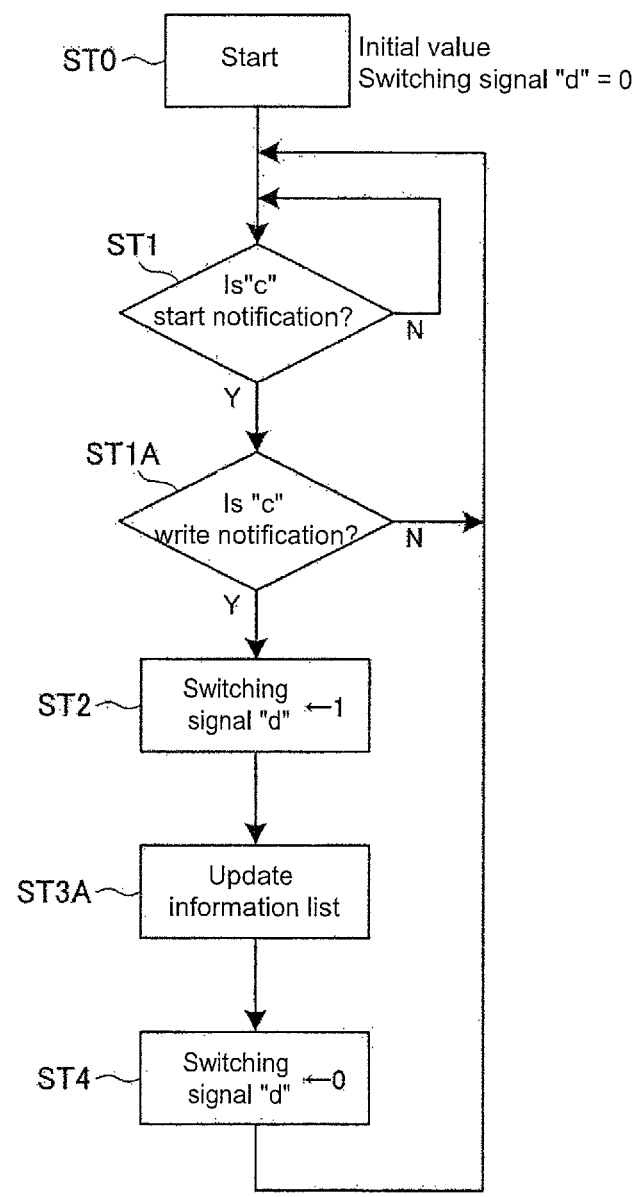
FIG. 5 is a flowchart showing a procedure of a host determination method (third method example) according to a fourth embodiment.
Figure 9:
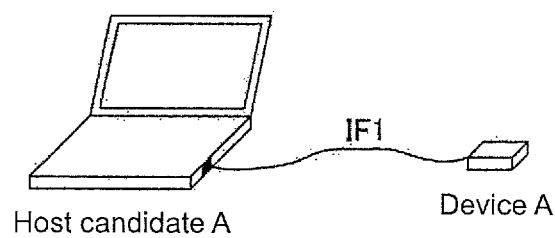
FIG. 9 is a diagram showing a connection example of devices.
Figure 10A:
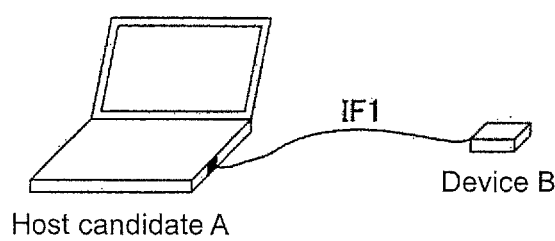
FIG. 10A is a diagram showing a connection between an electronic apparatus and a host candidate A.
Figure 10B:
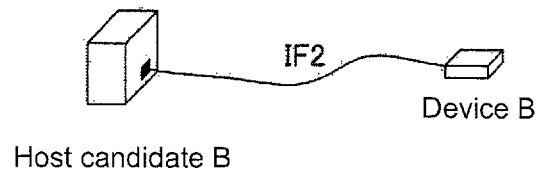
FIG. 10B is a diagram showing a connection between the electronic apparatus and a host candidate B.
Figure 11:
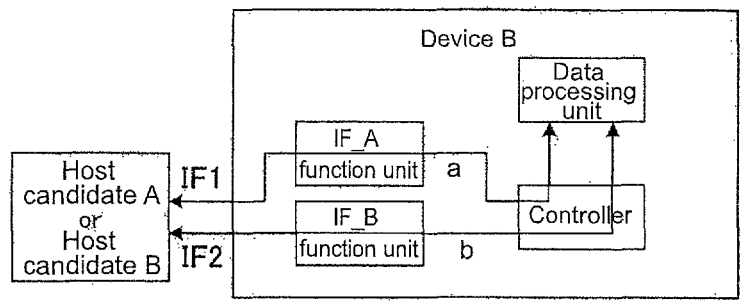
FIG. 11 is a block diagram of a device B, showing the configuration disclosed in Patent Document 1 by restructuring the configuration for each function.
Figure 12:
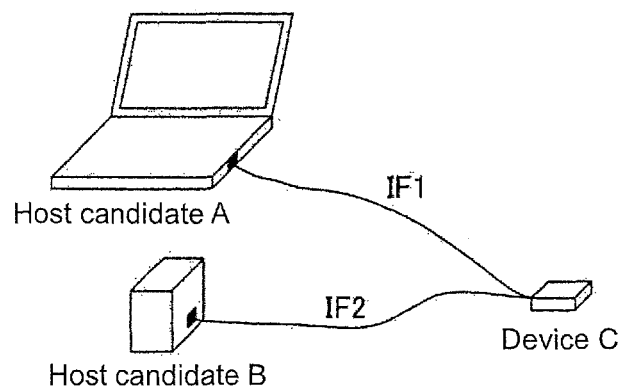
FIG. 12 is a diagram obtained by changing FIGS. 10A and 10B so as to show a connection relationship equivalent to that of a device C disclosed in Patent Document 2 (the device B is changed to the device C)
Figure 13:
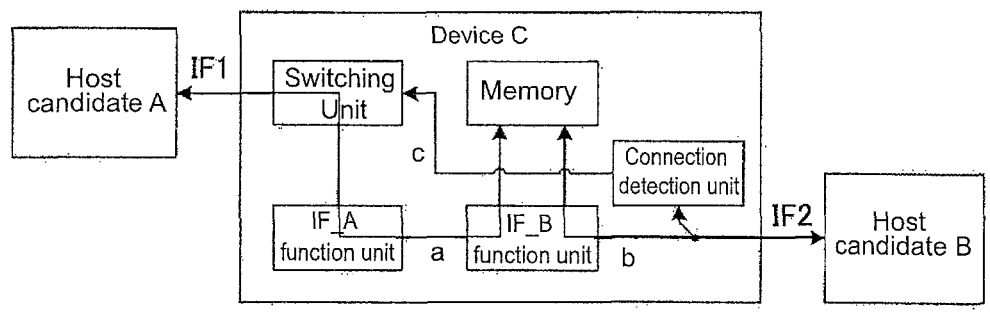
FIG. 13 is a block diagram of a device C, showing the configuration disclosed in Patent Document 2 by restructuring the configuration so as to correspond to FIG. 12.
Figure 14:
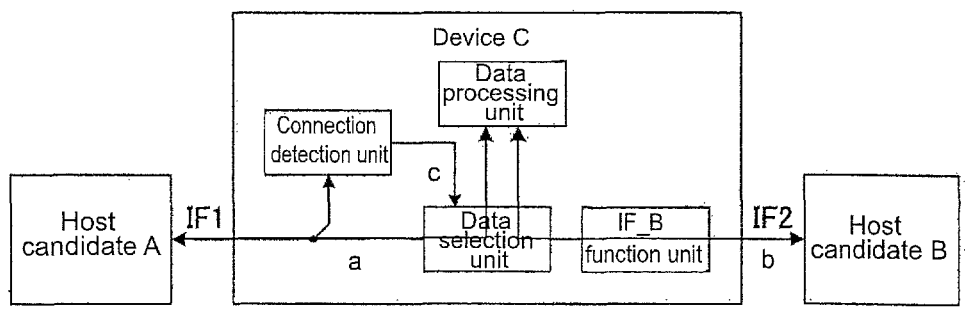
FIG. 14 is a block diagram of a device C, showing the configuration disclosed in Patent Document 3 by restructuring the configuration so as to correspond to the block diagrams of the other Patent Documents.
Figure 15:
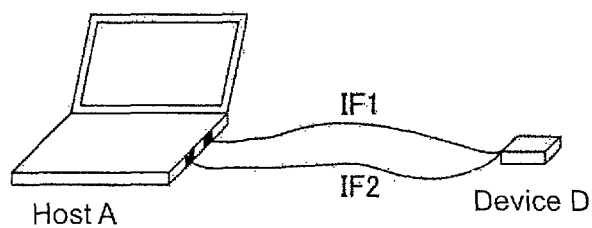
FIG. 15 is a diagram obtained by changing FIG. 12 so as to show a connection relationship equivalent to that of a device disclosed in Patent Document 4.
Figure 16:
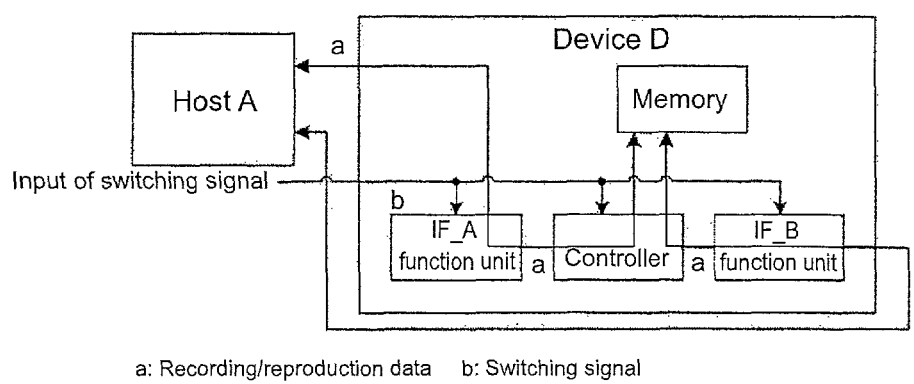
FIG. 16 is a block diagram of the device, showing the configuration disclosed in Patent Document 4 by restructuring the configuration so as to correspond to FIG. 15.

FIG. 5 is a flowchart showing a procedure of a host determination method (third method example) according to a fourth embodiment.

The third method example shown in FIG. 5 is different from the second method example shown in FIG. 4 in that Step ST3A is provided instead of Step ST3 for a detection of and wait for a termination notification, located between Steps ST2 and ST4 of FIG. 4. In Step ST3A, a list of inside information in the memory 13 is undated. Other steps in the third method example are basically the same as those in the first method example and the second method example.

As in the second method example, at the time when the controller 14 recognizes a write notification in Step ST1A, the host candidate B (2B) serving as a transmission source of the write notification is determined to be a "host". Subsequently, the switching signal "d" is changed to be 1, which is also the same as in the second method example.

In the third method example shown in FIG. 5, an operation of the host candidate B (2B) performed on the memory 13 is recording. Therefore, in the next Step ST3A, a list of inside information of the memory 13 is updated. Although the memory 13 may hold the list of inside information, it is desirable for the controller 14 to hold the list of inside information in a RAM thereof or the like such that the list of inside information can be read immediately. Every time the inside information of the memory 13 is rewritten, the controller 14 updates a list within the RAM as well.

All host candidates whose interfaces are connected can constantly refer to the list of inside information.

In the third method example, after completion of update of the inside information, the controller 14 immediately reconnects the interface of the host candidate A (2A) without waiting for a termination notification (Step ST4). The reconnection processing is performed in a period during which the host candidate B (2B) is recording or reproducing data, in many cases.

Upon completion of data recording/reproduction, the termination notification is issued from the host candidate B (2B), thus resetting the setting of "host".

At that time, the interface of the host candidate A (2A) is already reconnected. Therefore, the host candidate A can access the memory 13 to record/reproduce data without waiting for a reconnection. Therefore, it is possible to eliminate a time for connecting an interface after the reception of the termination notification, and host switching can be performed more effectively".

However, if the host candidate A (2A) is reconnected in Step ST2, the host candidate A (2A) does not know whether the setting of "host" of the host candidate B (2B) is reset by the termination notification. For that reason, it is necessary to prevent data write from the host candidate A (2A) after the reconnection.

As preventive measures, the technique using a busy signal, which has been described in (System for Preventing Write from Host Candidate A) in the second method example, and the like can be adopted suitably.

5. Fifth Embodiment

A fifth embodiment discloses a case where all host candidates are "host candidates A".

FIG. 6 is a block diagram of an electronic apparatus according to the fifth embodiment.

In FIG. 6, the host candidate device on the IF_B function unit 11B side of FIG. 2 is changed to a host candidate A (2A), and a switching unit 12B is additionally provided. It should be noted that a switching unit 12A of FIG. 6 corresponds to the switching unit 12 of FIG. 2.

Other configurations are the same as those of FIG. 2, and therefore the description thereof will be omitted in this embodiment.

Further, the first method example to the third method example described above are arbitrary applicable.

In this embodiment, the following effects are produced.

If an embodiment of the present disclosure is not applied, the host candidate A (2A) has to remove and insert a connector once in order to be a "host", because the host candidate A (2A) has an interface such as a USB interface. Here, assumed is a case where a host candidate A (2A) is already connected to one of two USB interfaces and another host candidate A (2A) is connected to the other USB interface. In this case, the host candidate A (2A) already connected is a "host". In the case where the other host candidate A (2A) connected afterward is intended to be set as a "host", it is necessary to remove all the USB interfaces and then connect a USB interface of a host candidate A (2A) expected to be a "host" or to perform manual switching with a switch.

Further, the host candidate A (2A) connected afterward is configured to operate as a "host" irrespective of the existence of the host candidate A (2A) previously connected to the electronic apparatus 1. Thus, malfunctions due to data collision occur.

In this embodiment, a host candidate A (2A) that outputs a trigger signal (reception signal for electronic apparatus 1) is set as a "host", and the interface of the other host candidate A (2A) is disconnected. Therefore, malfunctions due to data collision can be avoided even if a connector is removed or inserted manually or a switching operation is performed.

6. Sixth Embodiment

A sixth embodiment discloses a case where a plurality of host candidates A (2A) and a plurality of host candidates B (2B) exist.

FIG. 7 is a block diagram of an electronic apparatus according to the sixth embodiment. FIG. 7 shows "host candidates A" 2AI (I=1, . . . , M) and "host candidates B" 2BJ (J=1, . . . , N). It should be noted that M and N each represent any integer indicating 2 or more.

In FIG. 7, each of the host candidates A (2AI) meets any one of the definitions described above. Here, for example, it is assumed that each of the host candidates A (2AI) is a host candidate device to be set as a host based on only a connection operation of an interface from a disconnected state. The operation of a disconnection/connection of the interface is any of an insertion/removal of a connector of the interface and an electrical disconnection/connection of an IF_function unit to be described later. The host candidates A (2AI) each have a USB interface.

The host candidates B (2BJ) are each a host candidate device having an arbitrary interface.

In this embodiment, unlike the second to fourth embodiments, both the host candidates A (2AI) and the host candidates B (2BJ) are each a predetermined host candidate device that reads and writes inside information of the electronic apparatus 1 or changes the inside information.

The electronic apparatus 1 shown in FIG. 7 includes M IF_AI function units 11A1 to 11AM, N IF_BJ function units 11B1 to 11BN, M switching units 12A1 to 12AM, a memory 13, and a controller 14. It should be noted that in those configurations as well, a symbol "I" represents any integer of 1 to M and a symbol J represents any integer of 1 to N.

The controller 14 has functions of transmitting and receiving recording/reproduction data among the IF_A1 function unit 11A1 to the IF_Am function unit 11AM, the IF_B1 function unit 11B1 to the IF_Bn function unit 11BN, and the memory 13. Further, the controller 14 has a function of receiving switching control data ("e", "f", "g", "h") from any of the IF_A1 function unit 11A1 to the IF_Am function unit 11AM and the IF_B1 function unit 11B1 to the IF_Bn function unit 11BN and a function of transmitting switching signals "i1" to "iM" to the switching units 12A1 to the switching unit 12AM.

(Host Determination Method (Fourth Method Example))

Next, a description will be given on the generation of the switching signals "i1" to "iM" shown in FIG. 7 and a host determination method (fourth method example) based on the switching signals "i1" to "iM".

FIG. 8 is a flowchart showing the switching signals "i1" to "iM" in the controller 14 of a storage device to which the embodiment of the present disclosure is applied and showing a procedure of a host determination method (fourth method example) based on the switching signals "i1" to "iM".

Start (ST0) in the flowchart shows an initial state of the device (electronic apparatus 1). In the Start (ST0), after the initialization of the device, the controller 14 sets the switching signals "i1" to "iM" to 0 and waits until receiving a start notification. The controller 14 constantly or periodically monitors a reception of the start notification (Step ST1).

Here, the start notification is a notification with which a host candidate A (2AI) or a host candidate B (2BJ) starts recording/reproduction in and from the memory 13. The start notification is also one kind of the switching control data ("e", "f", "g", "h") (see FIG. 7) generated prior to the data transmission/reception, out of reception signals received by the electronic apparatus 1 from a host candidate that has issued the start notification. The switching control data ("e", "f", "g", "h") may be a start request instead of the start notification.

At the time when the controller 14 recognizes the start notification, the host candidate A (2AI) or the host candidate B (2BJ) serving as a transmission source of the start notification is determined to be a "host".

When detecting a reception of the start notification in Step ST1, the controller 14 distinguishes a notification device that has issued the start notification in the next Step ST2B, and reflects the result on the control of the subsequent switching signals "i1" to "iM". Specifically, in the case where the notification device is the host candidate A (2A1), only the switching signal "i1" is kept to be 0 and the other switching signals are changed to be 1. The same operation is performed for the second notification device, the third notification device, and so on. In the case where the last notification device is the host candidate A (2AM), only the switching signal "iM" is kept to be 0 and the other switching signals are changed to be 1. On the other hand, in the case where the notification device is the host candidate B (2BJ), all the switching signals "i1" to "iM" are changed to be 1.

Accordingly, the interfaces of the host candidates A (2AI) whose switching signals are set to be 1 are disconnected. Specifically, the controller 14 generates the switching signals "i1" to "iM" and transmits the switching signals "i1" to "iM" to the switching units 12, and the switching units 12 disconnect the interfaces of the host candidates A (2AI).

After that, the host and the electronic apparatus 1 perform data transmission/reception through a necessary procedure for establishing communications as in the second embodiment.

When the data transmission/reception is terminated, the controller 14 waits until receiving a termination notification. The controller 14 constantly or periodically monitors a reception of the termination notification (Step ST3).

Here, the termination notification is a notification with which the host candidate A (2AI) or the host candidate B (2BJ) terminates recording/reproduction in and from the memory 13. The termination notification is also one kind of the switching control data ("e", "f", "g", "h") (see FIG. 7) transmitted after the data transmission/reception, out of reception signals received by the electronic apparatus 1 from the host candidate A (2AI) or the host candidate B (2BJ). The switching control data ("e", "f", "g", "h") may be a termination request instead of the termination notification.

For example, at the time when the controller 14 recognizes the termination notification, the setting of "host" of the host candidate A (2AI) or the host candidate B (2BJ) serving as a transmission source of the termination notification is reset.

When detecting a reception of the termination notification in Step ST3, the controller 14 returns the switching signals "i1" to "iM" to be 0 in the next Step ST4 to reconnect all the interfaces of the host candidates A (2AI).

After that, the processing flow returns to the initial state after the start and enters again a standby state in which a reception of a start notification is monitored. When a start notification is received again, Steps ST1 to ST4 are executed again as described above. Then, a host candidate of a transmission source is set as a "host" and then data transmission/reception is performed. After that, the setting of "host" is reset.

The host determination method shown in FIG. 8 corresponds to both the start notification from the host candidate A (2AI) and the start notification from the host candidate B (2BJ). In notification steps ST21 to ST2M, the switching signal ("i1" to "iM") is set to be 1 and the interface of the host candidate A (2AI) or the host candidate B (2BJ) is disconnected. Of host candidates other than the notification device (i.e., host candidate that has issued the start notification), all interfaces corresponding to the host candidates A (2A) are disconnected. For that reason, different pieces of data from different host candidates are not simultaneously written in the same address of the memory and data collision does not occur, with the result that the device can be prevented from malfunctioning.

(Arbitration Between Host Candidates B)

It should be noted that when there are a plurality of host candidates A (2AI) or host candidates B (2BJ), each of which may be serve as a host, the determination of a host is desirably performed in the same manner as in a normal arbitration in communications. Since the arbitration technique has been described in the second embodiment, the description thereof will not be duplicated herein.

According to the first to sixth embodiments described above, high-speed switching between hosts or host switching by a plurality of times can be performed for a plurality of host candidates that have a difficulty in updating information even when the information in a device is updated. As a result, the improvement of usability or the development of new applications is expected.

The present disclosure contains subject matter related to that disclosed in Japanese Priority Patent Application JP 2012-075157 filed in the Japan Patent Office on Mar. 28, 2012, the entire content of which is hereby incorporated by reference.

It should be understood by those skilled in the art that various modifications, combinations, sub-combinations and alterations may occur depending on design necessary conditions and other factors insofar as they are within the scope of the appended claims or the equivalents thereof.

What is claimed is:

1. An electronic apparatus, comprising:
    a plurality of interfaces,
    a plurality of host candidate devices which are individually connected by the plurality of interfaces, where the plurality of host candidate devices are each configured for serving as a host device that controls the electronic apparatus; and
    a host determination controller, configured to
        determine a predetermined host candidate device, based on a reception signal received from one of the plurality of host candidate devices, which is configured to be a host device and serve as a transmission source of the reception signal, and
        control an electrical connection and disconnection of at least one of the plurality of interfaces, the at least one of the plurality of interfaces corresponding to at least one of the host candidate devices other than the predetermined host candidate device.

2. The electronic apparatus according to claim 1, wherein the host determination controller includes a controller configured to generate, based on the reception signal, a switching signal to control the electrical connection and disconnection of the at least one of the plurality of interfaces.

3. The electronic apparatus according to claim 2, wherein the host determination controller includes a switching unit configured to perform the electrical connection and disconnection of the at least one of the plurality of interfaces, and
the host determination controller is configured to perform the electrical connection and disconnection of the at least one of the plurality of interfaces by the switching unit based on the switching signal generated by the controller.

4. The electronic apparatus according to claim 2, wherein the host determination controller controls a function of switching between the electrical connection and disconnection of the at least one of the plurality of interfaces based on the switching signal generated by the controller.

5. The electronic apparatus according to claim 1, wherein the host determination controller is configured to disconnect the at least one of the plurality of interfaces when a start signal indicating one of a communication start request and a communication start notification is received.

6. The electronic apparatus according to claim 1, wherein the host determination controller is configured to disconnect the at least one of the plurality of interfaces when a write request signal of inside information is received after a start signal indicating one of a communication start request and a communication start notification is received.

7. The electronic apparatus according to claim 5, wherein the host determination controller is configured to reconnect the at least one of the plurality of interfaces when a termination signal indicating one of a communication termination request and a communication termination notification is received.

8. The electronic apparatus according to claim 5, wherein the host determination controller is configured
to disconnect the at least one of the plurality of interfaces,
to update a list of inside information, and
to reconnect the disconnected interface.

9. The electronic apparatus according to claim 2, the electronic apparatus being an apparatus capable of rewriting inside information by control of the host device, wherein
at least one of the plurality of host candidate devices is a device configured to perform, as a host, one of acquisition and recognition of a list of the inside information from the electronic apparatus to perform one of read and write of the inside information when connected to an interface.

10. An electronic apparatus, comprising:
a plurality of interfaces,
a plurality of host candidate devices which are individually connected by the plurality of interfaces, where the plurality of host candidate devices are each configured for serving as a host device that controls the electronic apparatus; and
a host determination controller, configured to
determine a predetermined host candidate device, based on a reception signal received from one of the plurality of host candidate devices, which is configured to be a host device and serve as a transmission source of the reception signal, and
control an electrical connection and disconnection of at least one of the plurality of interfaces, the at least one of the plurality of interfaces corresponding to at least one of the host candidate devices, other than the predetermined host candidate device, where at least one of the plurality of host candidate devices being configured to operate as a host device when connected to an interface.

11. A host determination method, comprising:
determining a predetermined host candidate device, based on a reception signal received from one of a plurality of host candidate devices, which is configured to be a host device and serve as a transmission source of the reception signal, where the plurality of host candidate devices connected to an electronic apparatus via a plurality of interfaces individually corresponding to the plurality of host candidate devices and where each of the plurality of host candidate devices are configured for of serving as a host device that controls an electronic apparatus; and
controlling an electrical connection and disconnection of at least one of the plurality of interfaces, the at least one of the plurality of interfaces corresponding to at least one of the host candidate devices, other than the predetermined host candidate device.

12. The host determination method according to claim 11, wherein
a switching signal to control the electrical connection and disconnection of the at least one of the plurality of interfaces is generated based on the reception signal.

13. The host determination method according to claim 11, wherein
the at least one of the plurality of interfaces is disconnected when a start signal indicating one of a communication start request and a communication start notification is received.

14. The host determination method according to claim 11, wherein
the at least one of the plurality of interfaces is disconnected when a write request signal of inside information is received after a start signal indicating one of a communication start request and a communication start notification is received.

15. The host determination method according to claim 13, wherein
the at least one of the plurality of interfaces is reconnected when a termination signal indicating one of a communication termination request and a communication termination notification is received.

16. The host determination method according to claim 13, wherein
the at least one of the plurality of interfaces is disconnected,
a list of inside information is to updated, and
the disconnected interface is reconnected.

17. The host determination method according to claim 12, wherein
the electronic apparatus is an apparatus capable of rewriting inside information by control of the host device, and
at least one of the plurality of host candidate devices is a device configured to perform, as a host, one of acquisition and recognition of a list of the inside information from the electronic apparatus to perform one of read and write of the inside information when connected to an interface.

18. A host determination method, comprising:
determining a predetermined host candidate device, based on a reception signal received from one of a plurality of host candidate devices, which is configured to be a host device and serve as a transmission source of the reception signal, where the plurality of host candidate devices connected to an electronic apparatus via a plurality of interfaces individually corresponding to the plurality of host candidate devices and where each of the plurality of host candidate devices are configured to be capable of serving as a host device that controls the electronic apparatus; and controlling an electrical connection and disconnection of at least one of the plurality of interfaces, the at least one of the plurality of interfaces corresponding to at least one of the host candidate devices, other than the predetermined host candidate device, being configured to certainly operate as a host device when connected to an interface.

\* \* \* \* \*